United States Patent [19]
Miyazaki et al.

[11] Patent Number: 5,743,479
[45] Date of Patent: Apr. 28, 1998

[54] DUAL BEARING FISHING REEL HAVING A SIDE PLATE COVERING A PORTION OF A SIDE OF THE REEL BODY

[75] Inventors: Takeo Miyazaki; Toshiro Ono, both of Tokyo; Shinichi Asano, Chiba, all of Japan

[73] Assignee: Daiwa Seiko, Inc., Tokyo, Japan

[21] Appl. No.: 683,308

[22] Filed: Jul. 18, 1996

[30] Foreign Application Priority Data

Aug. 2, 1995 [JP] Japan .................................. 7-216727

[51] Int. Cl.⁶ .................................................. A01K 89/015
[52] U.S. Cl. ........................ 242/312; 242/310; 242/314
[58] Field of Search ................................. 242/310, 312, 242/313, 314, 315

[56] References Cited

U.S. PATENT DOCUMENTS

| | | | |
|---|---|---|---|
| 5,120,002 | 6/1992 | Kawai | 242/314 |
| 5,127,603 | 7/1992 | Morimoto | 242/313 |
| 5,183,221 | 2/1993 | Kawai et al. | 242/310 |
| 5,370,331 | 12/1994 | Sato | 242/315 |
| 5,429,318 | 7/1995 | Sato | 242/314 |

FOREIGN PATENT DOCUMENTS

| | | | |
|---|---|---|---|
| 60-199334 | 10/1985 | Japan . | |
| 63-263033 | 10/1988 | Japan . | |
| 6-34463 | 5/1994 | Japan . | |
| 2 246 692 | 12/1992 | United Kingdom | 242/312 |

*Primary Examiner*—Katherine Matecki
*Attorney, Agent, or Firm*—Sughrue, Mion, Zinn, Macpeak & Seas, PLLC

[57] ABSTRACT

A dual bearing type reel formed so that a spool (16), which is supported for rotation between left and right side plates (12, 13) of the reel body, can be removed by removing the side plate that is opposite the handle side of the reel. The spool is removed from the frame (10) of the reel body by passing the spool through a hole in the frame. The profile of the side plate opposite the handle coincides with that of the frame, except for at the front portion of the reel body. The periphery of the frame in the front portion extends farther in the forward direction. The dual bearing type reel provides a good feel of gripping. It also is compact, protects its side plate from frontal impacts, and has a configuration preventing dirt from entering between the frame and the side plate, so that the facility of removal and attachment of the side plate is maintained.

5 Claims, 6 Drawing Sheets

DUAL BEARING FISHING REEL HAVING A SIDE PLATE COVERING A PORTION OF A SIDE OF THE REEL BODY

BACKGROUND OF THE INVENTION

The invention relates to a dual bearing type reel.

Unexamined Japanese Patent Publications (Kokai) No. 60-199334 and No. 63-263033 and Unexamined Japanese Utility Model Publication (Kokai) No. 6-34463 disclose reels in which a side plate on a side of the reel opposite the handle can be removed from the reel body when a spool supported for rotation between side plates of the reel body is removed or changed.

In the reel disclosed in Unexamined Japanese Patent Publication (Kokai) No. 60-199334, the side plate, which is detachably mounted to a frame of the reel body, is formed into the shape of a circle and is attached to the inside of the frame. In order to remove the side plate, it is rotated. The side plate includes convex and concave portions at the periphery thereof to perform the rotation operation. A portion of the periphery of the side plate extends outwardly beyond the frame. The extended portion and the convex and concave portions, however, deteriorate the feel of gripping the reel.

Further, there is essentially some clearance between the mounted side plate and the frame, into which dust, fish slime or the like, which are attached to the peripheral surface of the side plate when the reel is carried or held, tends to enter. Specifically, these foreign materials come into the clearance along the peripheral surface of the side plate. As a result, dirt adheres to the clearance and prevents the removal and attachment of the side plate. Furthermore, there is a limitation in reducing the diameter of the frame since the side plate is attached to the inside of the frame.

In the reels disclosed in Unexamined Japanese Patent Publication (Kokai) No. 63-263033 and Unexamined Japanese Utility Model Publication (Kokai) No. 6-34463, the spool can be removed when the side plate is rotated from a first to a second position. The diameter of the side plate is the same as that of the frame of the reel body. As a result, the side plate, as well as the frame, can be deformed easily when an external force is applied to the front portion of the reel body. Such deformation, in turn, may prevent proper rotation of the side plate.

SUMMARY OF THE INVENTION

Therefore, objects of the invention include providing an improved reel which has a good gripping feel, which is compact, and which has a side plate protected from impacts from the front side. It is a further object to provide a reel having a configuration that prevents dirt from entering between the frame and the side plate, thereby ensuring that the ease of removal and attachment of the side plate does not deteriorate over time.

In order to achieve the above objects, there is provided a dual bearing type reel formed so that a spool, which is supported for rotation between left and right side plates of the reel body, can be removed by removing the side plate opposite to the side where a handle is mounted from a frame of the reel body, and by passing the spool through a hole in the frame, characterized in that the profile of the side plate opposite to the handle substantially coincides with that of the frame, except for the front portion of the reel body, and in that the periphery of the frame in the front portion extends farther in the forward direction than does the side plate.

The profile of the side plate opposite to the handle substantially coincides with that of the frame, except for at the front portion of the reel body. This improves the feel of gripping when the reel is held from the rear side of the reel. Further, the side plate has substantially the maximum diameter of the frame, which permits making the hole in the frame for removing the spool as large as possible, and results in a compact reel.

Further, the front portion of the frame extends farther to the forward direction than the front portion of the side plate opposite to the handle. Thus, the side plate is protected from an impact from the front side. Furthermore, the edge portion of the side plate substantially coincides with the profile of the frame, other than where it extends into the frame, whereby dirt is substantially prevented from entering between the members.

DETAILED DESCRIPTION OF THE PREFERRED EMBODIMENTS

The invention will be described hereinafter in detail with reference to the embodiments illustrated in the attached drawings.

Figure 1:
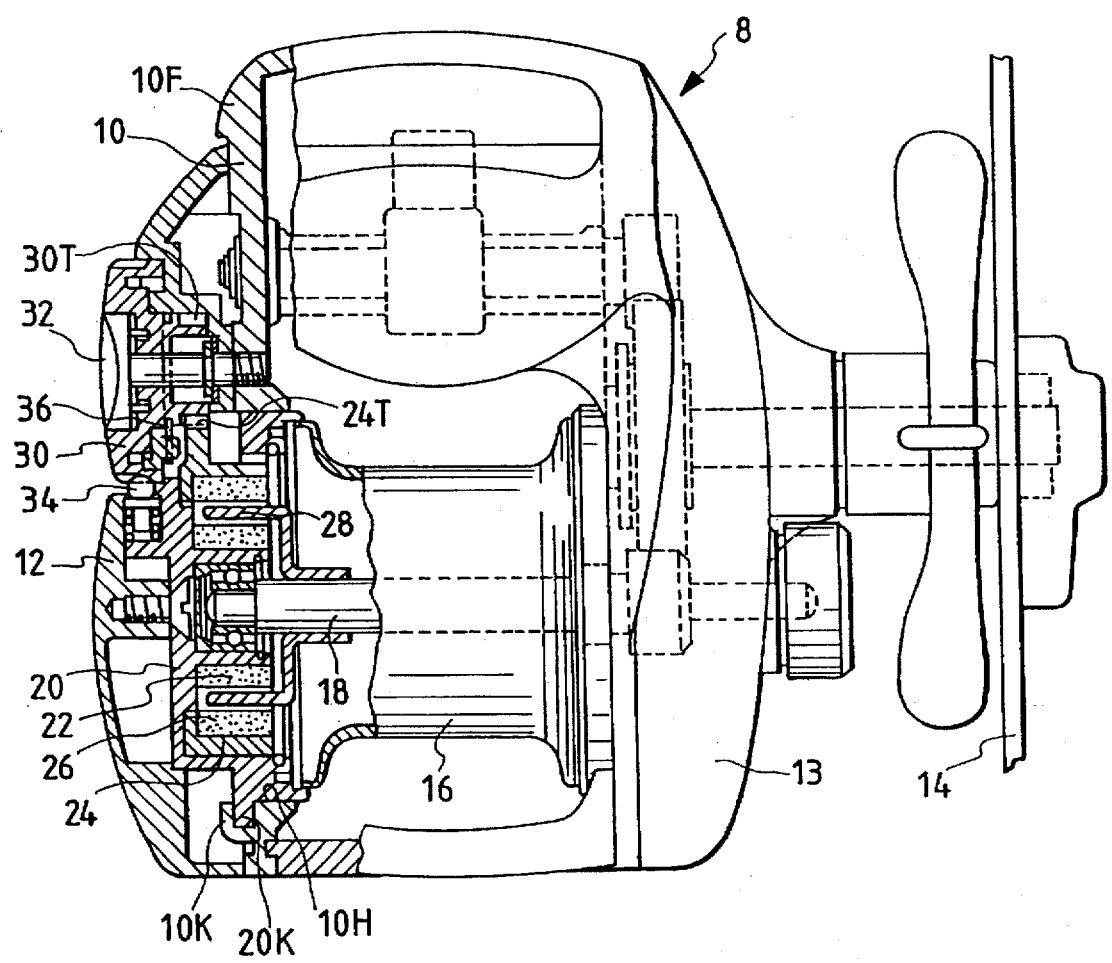
FIG. 1 is a top view of a dual bearing type reel according to the first embodiment of the invention.
Figure 2:
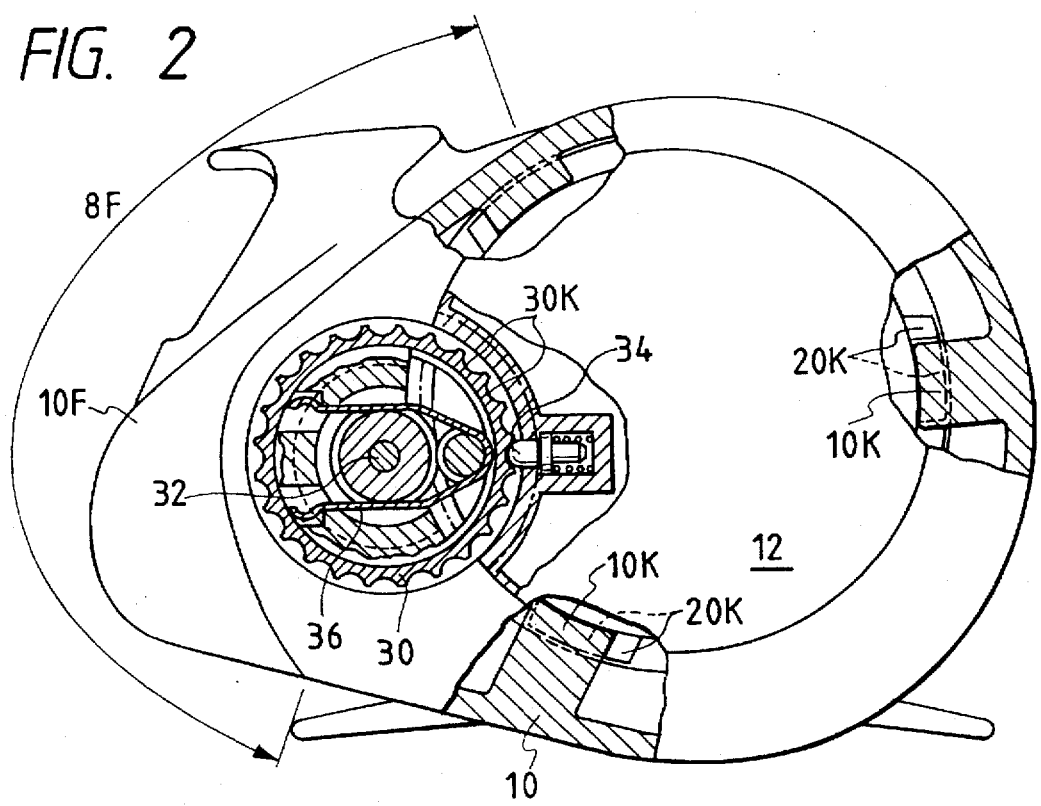
FIG. 2 is a partial sectional side view of the reel of FIG. 1.
Figure 3:
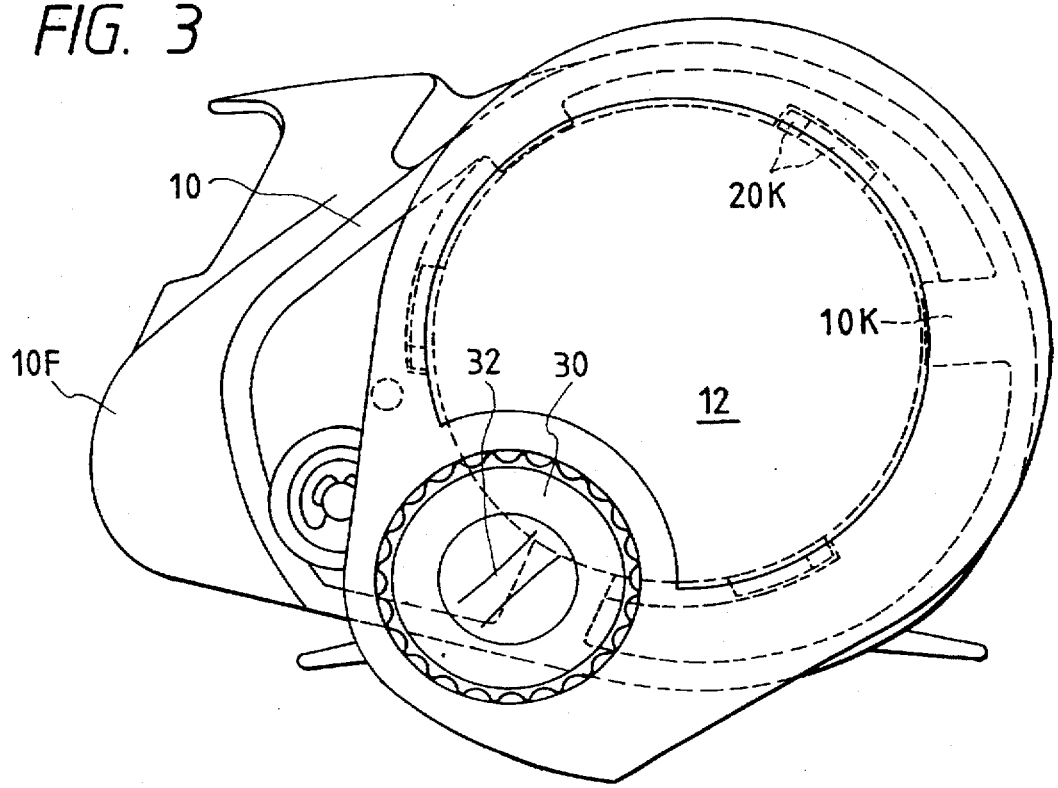
FIG. 3 is a side view of the dual bearing type reel of FIG. 1 when the side plate of the reel is rotated.
Figure 4:
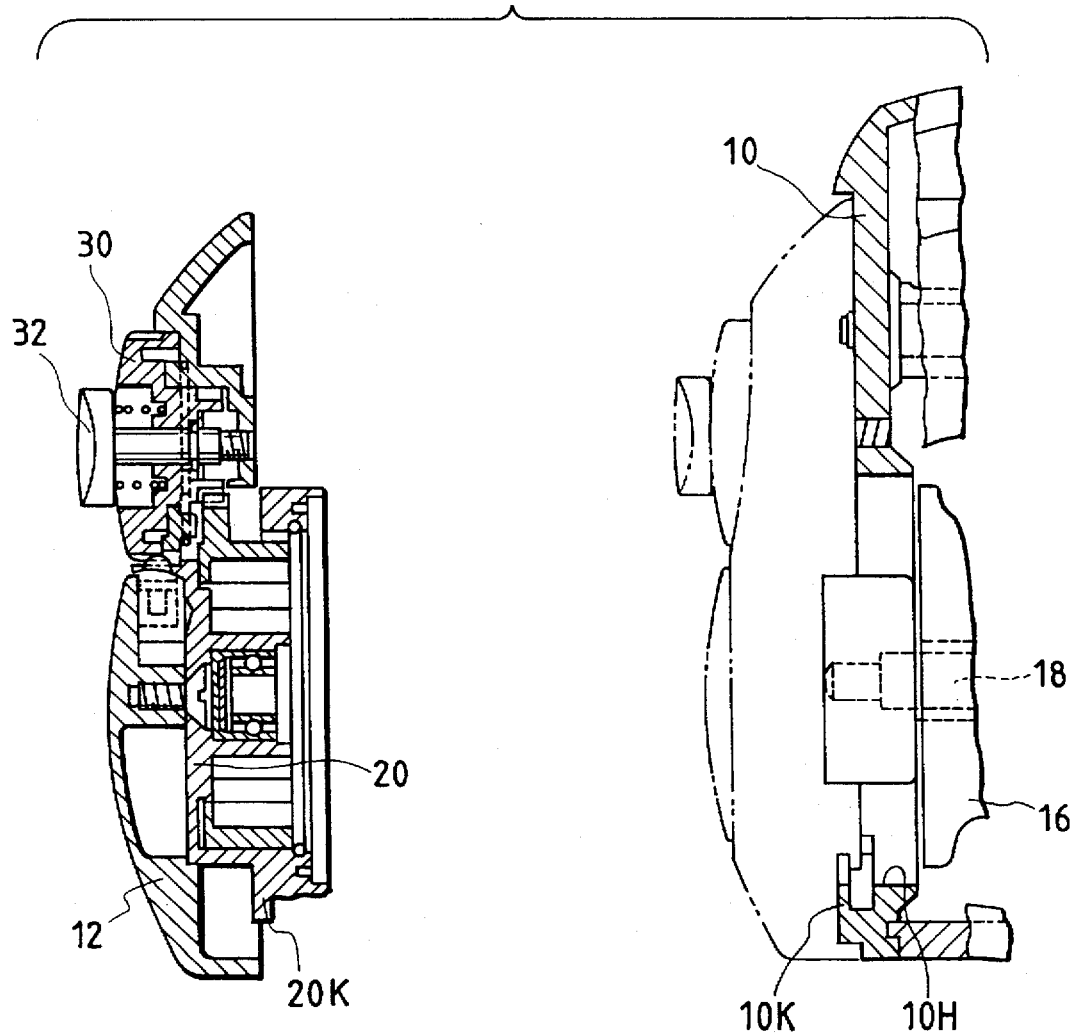
FIG. 4 illustrates a condition in which the side plate is removed.

FIG. 1 is a top view of a dual bearing type reel according to a first embodiment of the invention, and FIG. 2 is a partial sectional view of the reel of FIG. 1. FIG. 3 is a side view of the reel, for illustrating a process for removing a side plate from the reel, which side plate is shown in a mounted condition in FIG. 2. FIG. 4 is a top view of the reel in which the side plate is removed.

The reel body 8 shown in FIG. 1 has a frame 10 and left and right side plates 12 and 13. A handle 14 is mounted to the right side plate 13 of the reel body 8. A spool shaft 18 extends between the left and right side plates on which a spool 16 is mounted for rotation with the shaft 18.

A brake device supporting member 20 is secured to the left side plate 12 opposite to the handle 14. The left side plate 12, to which the brake device supporting member 20 is integrally connected, is secured to the frame 10 in a normal fashion by means of an arrangement described hereinafter. At the center of the brake device supporting member 20, one end of the spool shaft 18 is rotatably supported through a bearing. The other end of the spool shaft is rotatably supported in the right side plate 13. On the other hand, the brake device supporting member 20 houses a pivot member 24 which is pivotably supported to the brake device supporting member about the center of the spool shaft 18.

Mounted to the reel body 8 at a slightly forward position thereof is a brake adjustment knob 30 which includes a teeth portion 30T meshing with a teeth portion 24T of the pivot member. The knob 30 is held by the left side plate 12 through a spring member 36, and is pivotable about a screw member 32 bolted to the frame 10.

The left side plate 12, to which the brake device supporting member 20 is integrally connected, is secured to the frame 10 by means of the screw member 32. Further, frame 10 includes engagement portions 10K which have an L-shaped section as shown in FIG. 1. The brake device supporting member 20 also includes corresponding engagement portions 20K. The engagement portions 10K and 20K are concentric to the spool shaft 18, and angularly spaced to each other.

Removing the screw member 32 allows the left side plate 12 to rotate about the spool shaft 18 with the brake device supporting member 20, the engagement portions thereby engaging with each other. The engagement portions 20K are formed to abut and lock the engagement portions 10K of the frame when the brake device supporting member 20 rotates in the clockwise direction.

An annular conductive member 28, made of a material such as aluminum and copper which is not a ferromagnetic material, is mounted to the left end portion of the spool shaft 18, and extends about the spool shaft. An inner annular magnetic pole member 22 is secured to the brake device supporting member 20 about the spool shaft, so as to face the inner surface of the annular conductive member 28. The inner magnetic pole member 22 has an annular magnet which includes a plurality of sets of radial N and S poles, which sets are alternatingly and circumferentially arranged at a given spacing to face to each other.

The inner magnetic pole member 22 also has an annular yoke made of a ferromagnetic material such as iron, which is fitted to the inner surface of the annular magnet.

On the other hand, an outer annular magnetic pole member is secured to the inner surface of the pivot member 24 about the spool shaft at the outside of the annular conductive member 28. The outer magnetic pole member has an annular magnet which includes a plurality of sets of radial N and S poles which sets are alternatingly and circumferentially arranged so that the magnetic poles of each set are opposite to those of each set of the inner annular magnetic pole member. The outer magnetic pole member additionally has an annular yoke made of a ferromagnetic material such as iron which is fitted to the inner surface of the annular magnet.

Since the teeth portion 30T meshes with the teeth portion 24T of the pivot member 24, rotation of the brake device adjustment knob 30 about the screw member 32 rotates the pivot member 24 within the brake device supporting member 20 to move the angular position of the outer magnetic pole member 26 within a rotational angle from NS poles of the inner magnetic pole member 22 up to the adjacent SN poles.

When the outer annular magnetic pole member 26 moves to a rotational position so that opposite poles face to those of the inner annular magnetic pole member 22, the gap magnetic flux is maximized so that the swirl current generated in the annular conductive member 28 is maximized and the maximum braking force is generated to brake the rotation of the spool 16 with the spool shaft. When the outer magnetic pole member 26 is rotated from the condition in which the maximum braking force is generated, the braking force is gradually decreased, and when the same poles face to each other, the braking force is decreased to zero.

The brake adjust knob 30 includes, as shown in FIG. 2, recessed portions 30K regularly arranged along the outer circumference thereof to engage an elastically biased protruding member 34. The protruding member 34 enables rotation of the brake adjust knob 30 step by step, and generates a click sound at each rotation step.

The profile of the left side plate 12 substantially coincides with that of the frame 10, except for at a front portion 8F of the reel body 8. This improves the feel of the side plate when gripped by the palm of an operator. A front portion 10F of the frame 10 extends farther in the forward direction than does the side plate 12. Thus, the left side plate 12 is protected from an impact from the front side, thereby preventing deformation. Also, the removal of the left side plate 12 is facilitated when the spool is removed and inserted. Further, the edge portion of the left side plate substantially coincides with the profile of the frame, as shown in FIG. 1. Thus, in contrast to the conventional designs discussed in the introduction, the side plate abuts against the frame face rather than extending into the frame 10, whereby dirt is substantially prevented from entering between the members.

Furthermore, at the left side of the frame 10, a hole 10H is provided for removing the spool 16 from the reel body for maintenance etc. The profile of the left side plate substantially coincides with that of the frame except for the front portion as mentioned above, which allows the hole 10H to be made as large as possible, and the reel can be compact accordingly.

The removal of the spool 16 is carried out by removing the screw member 32 from the frame 10. Then, the left side plate 12 is rotated in the counterclockwise direction in FIG. 2 about the spool shaft 18. This rotation disengages the engagement portions 20K from the corresponding engagement portions 10K as shown in FIG. 3 since the brake device supporting member 20 is integrally connected to the left side plate 12. Thereafter, the left side plate 12 is removed as shown in FIG. 4 by pulling it in the axial direction away from the spool shaft. Then, the spool 16 can be drawn with the spool shaft 18 through the hole 10H. Re-assembling these components is carried out in reverse order and direction to the process described above. Rotation of the left side plate 12 in the clockwise direction abuts and engages the engagement portions 20K with the engagement portions 10K. Then, the screw member 32 is threadingly secured.

Figure 5:
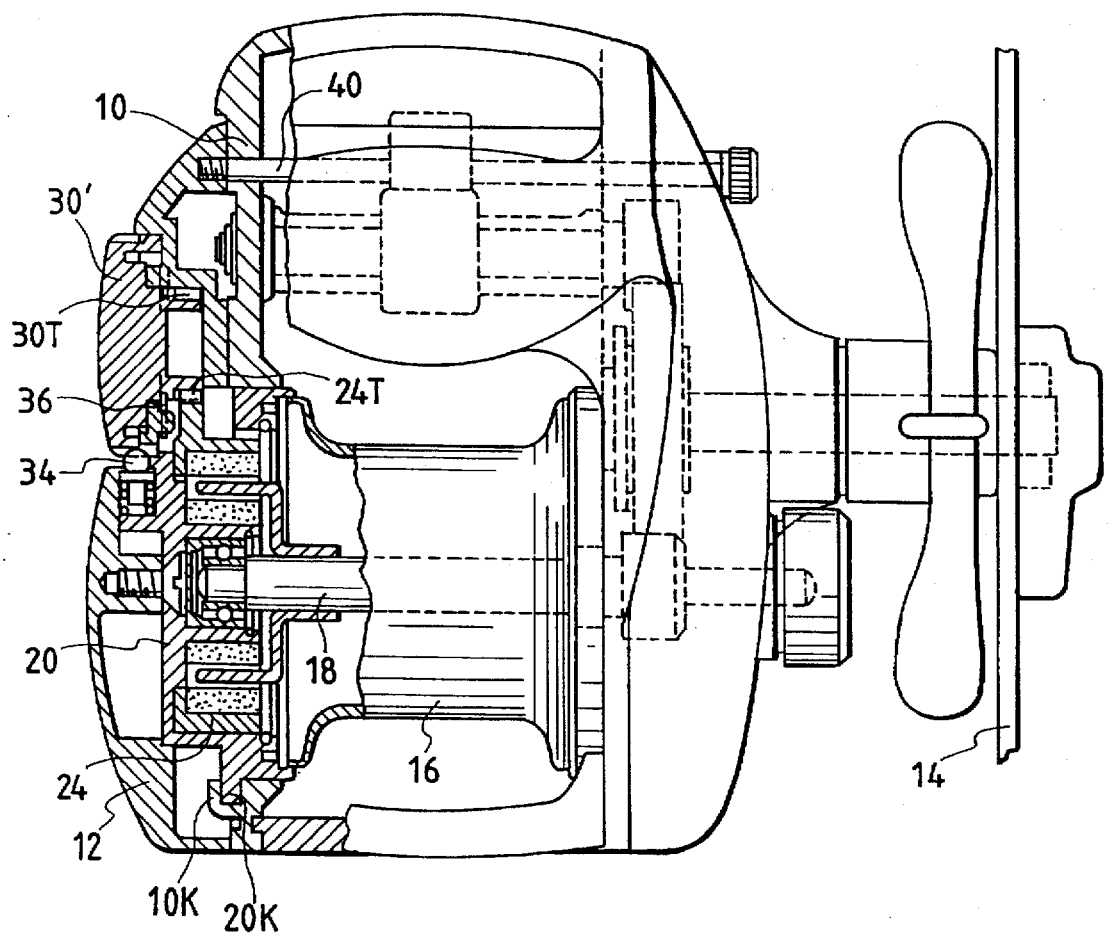
FIG. 5 is a top view of a dual bearing type reel according to another embodiment of the invention.
Figure 6:
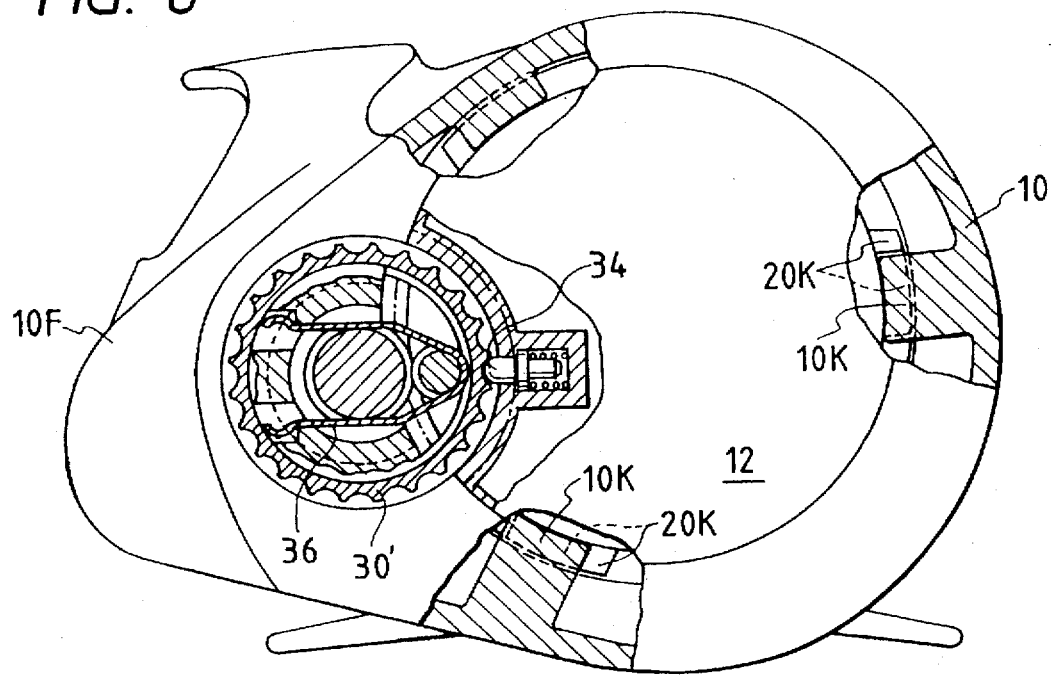
FIG. 6 is a partial sectional side view of the reel of FIG. 5.
Figure 7:
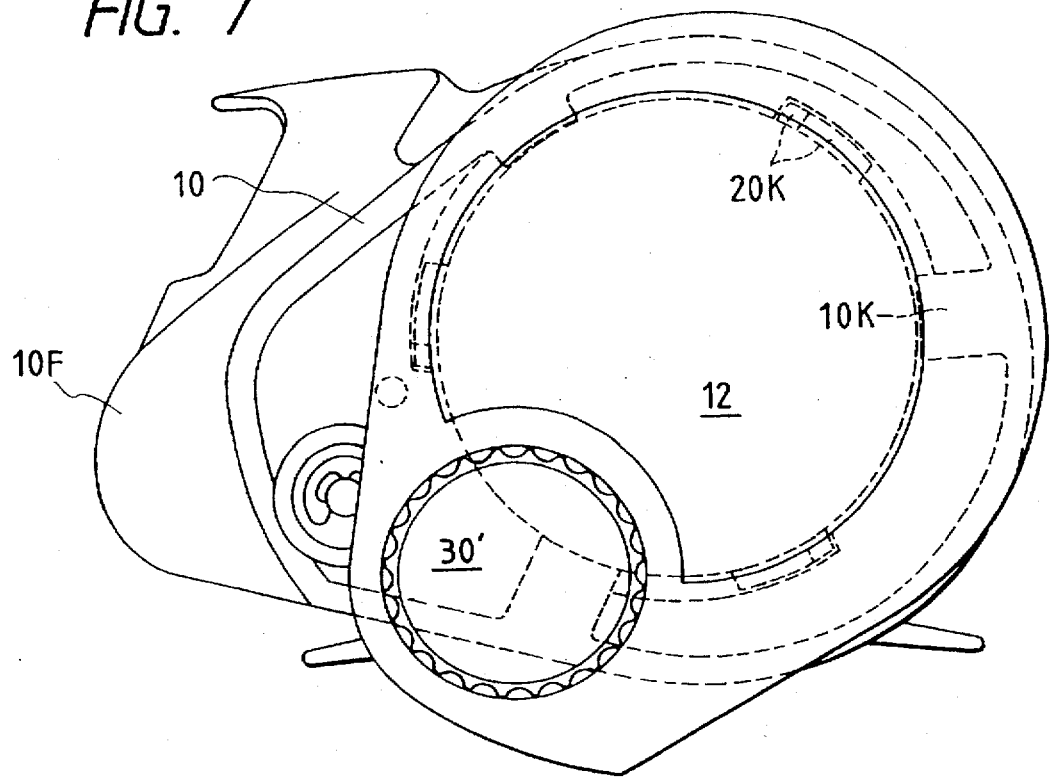
FIG. 7 is a side view of the dual bearing type reel of FIG. 5 when the side plate of the reel is rotated.

FIGS. 5 to 7 are similar to FIGS. 1 to 3 respectively, and illustrate another embodiment of the invention. A brake adjustment knob 30', which does not have a screw member 32, is rotatable relative to the left side plate 12. The left side plate 12 is secured to the frame 10 by using a through screw member 40 which extends through the front portion of the reel body. The other components are constituted as in the first embodiment. FIG. 7 illustrates a process for removing the left side plate 12, in which the through screw member 40 has already been removed.

Figure 8:
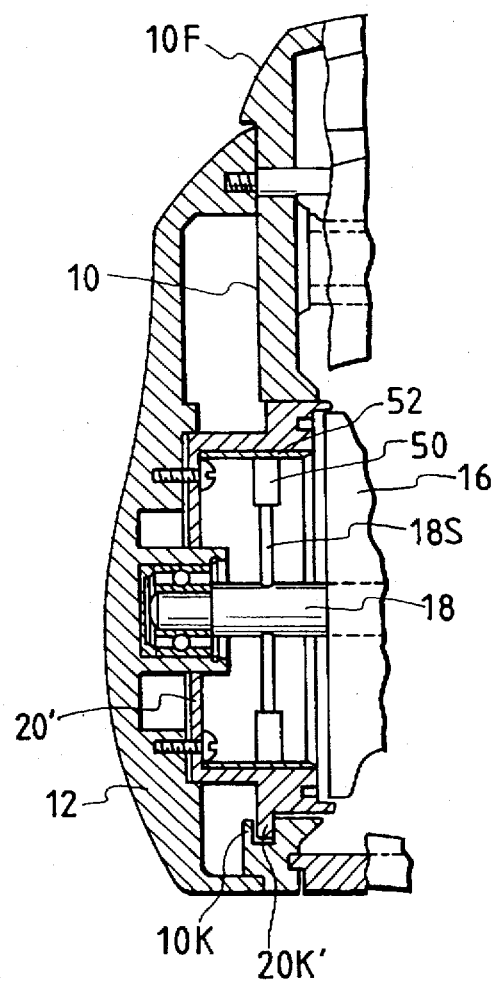
FIG. 8 is a partial, top view of a dual bearing type reel according to another embodiment of the invention.

FIG. 8 illustrates another embodiment, in which a centrifugal brake device is used instead of the magnetic brake device described above. A supporting shaft 18S extends through the spool shaft 18 to which brake collars 50 are slidably mounted. A supporting member 20' is mounted to the left side plate 12 by screws. A brake drum 52 is mounted to the inner surface of the supporting member 20'. The frame 10 includes the engagement portions 10K, and the supporting member 20' includes the engagement portions 20K which engage the engagement portions 10K as in the preceding embodiments. Thus, when the spool 16 rotates with the spool shaft 18 at high speed, the brake collars 50 are biased against the brake drum 52 by the centrifugal force to brake the rotation automatically. The relation of the profiles of the left side plate and the frame 10 is the same as in the preceding embodiments, and provides the same effect.

The invention can be applied to other dual bearing type bearings which do not include the magnetic or centrifugal brake devices described above.

It will be apparent from the description, according to the invention, the profile of the side plate opposite to the handle substantially coincides with the profile of the frame except for at the front portion of the reel body, to improve the feel of the grip by the palm of an operator. Further, the side plate has substantially the maximum diameter of the frame, which enables making the hole in the frame for removing the spool as large as possible. It further serves to make the reel compact.

Further, the front portion of the frame extends farther in the forward direction than does the side plate opposite the handle. Thus, the side plate is protected from frontal impacts. Furthermore, the edge portion of the side plate substantially coincides with the profile of the frame, unlike the configuration described in the prior art publications, where the edge portion extends into the frame. This aspect of the invention ensures that dirt cannot enter between the members. Therefore, the side plate can be removed easily even after protracted use.

What is claimed is:

1. A dual bearing fishing reel comprising:
    (a) a reel body defining a first side, a second side opposite the first side, and a front side extending between the first side and the second side, said reel body further defining a front portion, which includes the front side and a front section of each of the first side and the second side, and a remaining portion, which is disposed behind the front portion of said reel body, said reel body comprising:
        a frame having an opening in the remaining portion on the first side of said reel body;
        a first side plate detachably mounted to said frame on the first side of said reel body; and
        a second side plate mounted to said frame on the second side of the reel body; and
    (b) a handle mounted adjacent to said second side plate on the second side of said reel body;
    (c) a spool detachably mounted in the remaining portion of said reel body; and
    (d) a support rotatably supporting said spool and mounted between said first side plate and said second side plate;
    wherein the opening in said frame is sufficiently large to receive said spool in an operation for removing said spool from or inserting said spool into said reel body;
    wherein said frame extends at least partially across the front side of said reel body, extends completely across the front section of the first side of said reel body, and extends completely across an edge extending between the front side and the front section of the first side of said reel body;
    wherein said first side plate, when mounted to said frame, extends completely across the first side in the remaining portion of said reel body, thereby completely covering the opening in said frame; and
    wherein an outer perimeter of said frame in the remaining portion on the first side of said reel body substantially coincides with an outer perimeter of said first side plate in the remaining portion on the first side of said reel body.

2. The dual bearing fishing reel according to claim 1, wherein said support rotatably supporting said spool comprises a spool shaft; and
    wherein said first side plate is rotatably affixed to said spool shaft.

3. The dual bearing fishing reel according to claim 1, wherein an inner surface of said first side plate, when mounted to said frame, contacts an outer surface of said frame at each point along the outer perimeter of said first side plate.

4. The dual bearing fishing reel according to claim 1, further comprising a brake device supporting member secured to said first side plate.

5. The dual bearing fishing reel according to claim 1, further comprising:
    first engagement portions arranged on an inner surface of said first side plate; and
    second engagement portions arranged on a perimeter of the opening in said frame on the first side of the reel body;
    wherein said first engagement portions are positioned and spaced to frictionally engage said second engagement portions when said first side plate is mounted to said frame.

* * * * *